United States Patent
Muratsubaki et al.

(10) Patent No.: US 11,473,652 B2
(45) Date of Patent: Oct. 18, 2022

(54) CHAIN GUIDE

(71) Applicant: TSUBAKIMOTO CHAIN CO., Osaka (JP)

(72) Inventors: Kenji Muratsubaki, Osaka (JP); Tsutomu Namie, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 23 days.

(21) Appl. No.: 17/209,470

(22) Filed: Mar. 23, 2021

(65) Prior Publication Data
US 2021/0317899 A1    Oct. 14, 2021

(30) Foreign Application Priority Data
Apr. 10, 2020 (JP) .............................. JP2020-070943

(51) Int. Cl.
*F16H 7/18* (2006.01)
*F16H 7/08* (2006.01)

(52) U.S. Cl.
CPC ....... *F16H 7/18* (2013.01); *F16H 2007/0872* (2013.01); *F16H 2007/185* (2013.01)

(58) Field of Classification Search
CPC ...... F16H 7/06; F16H 7/18; F16H 2007/0872; F16H 2007/185; F16H 2007/0893; F16H 7/08
USPC ................................................. 474/111, 140
See application file for complete search history.

(56) References Cited

U.S. PATENT DOCUMENTS

| | | | |
|---|---|---|---|
| 5,045,032 A * | 9/1991 | Suzuki ...................... | F16H 7/08 474/140 |
| 5,961,411 A * | 10/1999 | Tsutsumi .................. | F16H 7/18 474/140 |
| 6,585,614 B1 | 7/2003 | Kumakura | |
| 2002/0107097 A1* | 8/2002 | Takeda ...................... | F16H 7/08 474/140 |
| 2013/0225342 A1* | 8/2013 | Yokoyama ............... | F16G 13/06 474/140 |
| 2014/0187371 A1* | 7/2014 | Lee ............................ | F16H 7/18 474/140 |
| 2015/0204437 A1* | 7/2015 | Utaki ....................... | F16H 57/05 474/91 |
| 2016/0138684 A1* | 5/2016 | Kurono ..................... | F16H 7/18 474/140 |

(Continued)

FOREIGN PATENT DOCUMENTS

| | | | | |
|---|---|---|---|---|
| CN | 103697123 A | * | 4/2014 | ............... F16H 7/18 |
| CN | 107289080 A | * | 10/2017 | ............... F16H 7/18 |

(Continued)

*Primary Examiner* — Michael R Mansen
*Assistant Examiner* — Raveen J Dias
(74) *Attorney, Agent, or Firm* — WHDA, LLP

(57) ABSTRACT

To provide a universal design chain guide that can provide a position, track, and length of contact between the chain guide and the chain for optimal performance even when used with different types of chains. The chain guide includes a guide surface slidably guiding a running chain and at least one mounting part. The guide surface includes a first guide surface extending along a longitudinal direction and a second guide surface parallel to and protruding more than the first guide surface. The second guide surface protrudes from the first guide surface with varying heights along the longitudinal direction.

5 Claims, 4 Drawing Sheets

(56) References Cited

U.S. PATENT DOCUMENTS

2020/0116240 A1* 4/2020 Iwasaki .................... F16H 7/18

FOREIGN PATENT DOCUMENTS

| DE | 102008047063 A1 | * | 3/2010 | ............... F16H 7/18 |
|----|----|----|----|----|
| JP | H10288249 A | * | 10/1998 | ....... F16H 2007/185 |
| JP | 2001-41299 A | | 2/2001 | |
| JP | 2010084882 A | * | 4/2010 | ............... F16H 7/00 |
| JP | 2010281353 A | * | 12/2010 | ............... F16H 7/18 |

* cited by examiner

CHAIN GUIDE

BACKGROUND OF THE INVENTION

1. Field of the Invention

The present invention relates to a chain guide having a guide surface that slidably guides a running chain, and at least one mounting part.

2. Description of the Related Art

It is common practice to use a chain guide that has a guide surface slidably guiding a running chain and a main body supporting the guide surface along the chain running direction for stabilizing the running chain and keeping correct tension between sprockets.

A timing system for engines such as the one illustrated in FIG. 8 is known, for example, wherein an endless timing chain CH, such as a roller chain, bushing chain, or silent chain, is passed around sprockets S1 and S2 respectively attached to a crankshaft and camshafts inside an engine room E. The endless timing chain CH, which is passed around the drive sprocket S1 attached to the crankshaft and the pair of driven sprockets S2 attached to the camshafts inside the engine room E, is guided by a pivoting chain guide (pivoting guide) 500 and a chain guide (fixed guide) 600.

The chain guide (fixed guide) 600 is fixedly mounted inside the engine room E by the use of two mounting parts 623 with two mounting shafts Q.

The chain guide (pivoting guide) 500 has a mounting part 523 mounted such as to be pivotable around a pivot shaft P in the plane in which the chain CH is passed around inside the engine room E.

A chain tensioner T presses a pressed part 524 of the chain guide (pivoting guide) 500 to keep correct tension and to suppress vibration of the timing chain CH.

SUMMARY OF THE INVENTION

For attaching such known chain guides inside the engine room E as in the example of FIG. 8, the position, track, length, etc. of contact between the chain guides and the chain are determined based on engine specifications, chain layout, standards of the chain to be used, etc., to achieve optimal performance, and individually tailored chain guides are used.

For different engine specifications or chain layouts, chain guides having different specifications needed to be designed and produced.

To allow usage of the same chain guide for engines with different mounting parts, the chain guide may be provided with a plurality of mounting parts as known from Japanese Patent Application Laid-open No. 2001-041299, for example.

For different chain layouts, however, optimal performance is hard to achieve with the same chain guide.

Even though the chain layouts are the same and the chain guide has the same mounting parts, different chain guides needed to be designed and produced because the position, track, length, etc. of contact between the chain guides and the chain would differ for optimal performance of chains of different standards.

The present invention solves these problems, its object being to provide a universal chain guide that can provide a position, track, and length of contact between the chain guide and the chain for optimal performance even when used with different types of chains.

The present invention solves the problems described above by providing a chain guide having a guide surface that slidably guides a running chain, and at least one mounting part, the guide surface including a first guide surface extending along a longitudinal direction and a second guide surface parallel to and protruding more than the first guide surface, the second guide surface protruding from the first guide surface with varying heights along the longitudinal direction.

According to the chain guide set forth in claim 1, the guide surface includes a first guide surface extending along a longitudinal direction and a second guide surface parallel to and protruding more than the first guide surface, and the second guide surface protrudes from the first guide surface with varying heights along the longitudinal direction. The chain slidably guided by the first guide surface and the chain slidably guided by the second guide surface can have different positions, tracks, and lengths of contact between the chain guide and the chain. The same chain guide can thus provide a position, track, and length of contact between the chain guide and the chain for optimal performance.

According to the configuration set forth in claim 2, the first guide surface and the second guide surface have an arc-shaped track in a longitudinal direction with different centers, which allows different tracks to be formed easily.

According to the configuration set forth in claim 3, the first guide surface is formed on both sides in a width direction of the second guide surface. In the case of a roller chain or bushing chain, link plates slide on the first guide surfaces on both sides in the width direction, whereas a silent chain slides on the second guide surface in the center in the width direction on the backside thereof. Thus the center position in the width direction can be made the same for all types of chains.

According to the configuration set forth in claim 4, a guide lip is provided on both sides in a width direction of the guide surface, the guide lip being formed to protrude higher than the second guide surface in a portion adjoining the guide surface. This can minimize a widthwise displacement of the silent chain that is guided on the second guide surface.

According to the configuration set forth in claim 5, at least one end in the longitudinal direction of the guide surface is formed with an inclined surface smoothly continuous with at least one of the first guide surface and the second guide surface. Thus optimal positions of contact and lengths of contact for both of two types of chains can be provided.

DESCRIPTION OF THE PREFERRED EMBODIMENTS

Figure 1:
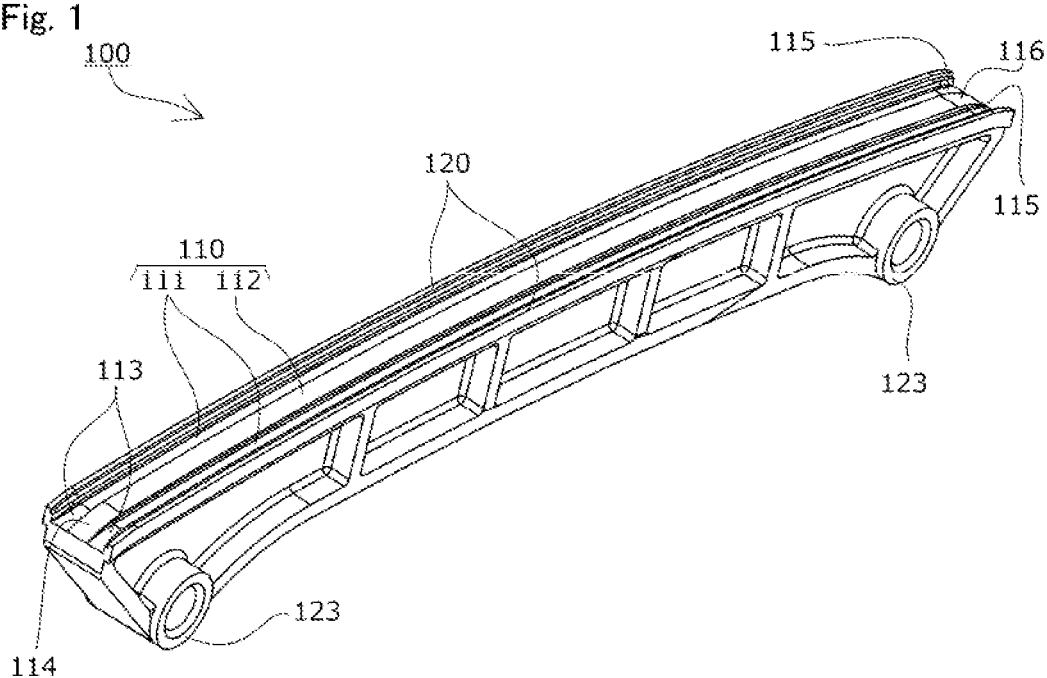
FIG. 1 is a perspective view of a chain guide (fixed guide) according to one embodiment of the present invention.
Figure 2:
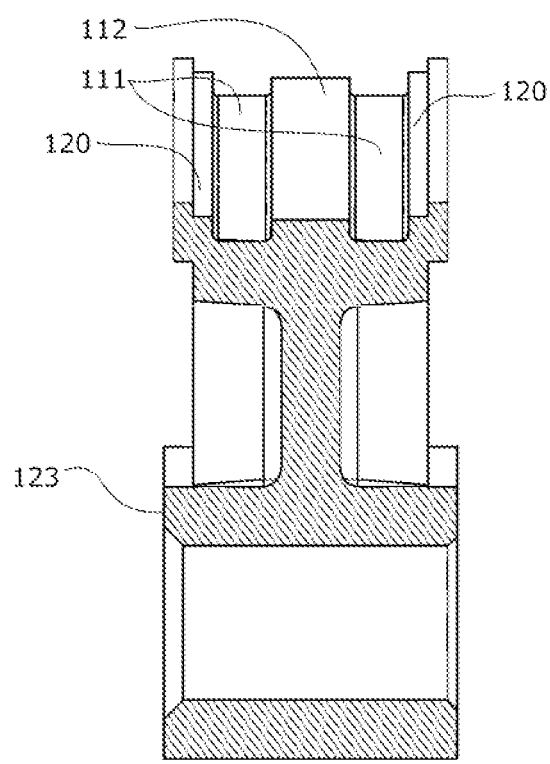
FIG. 2 is a cross-sectional view of FIG. 1.

A chain guide (fixed guide) 100 according to one embodiment of the present invention is fixed inside an engine having a timing system for guiding a timing chain to run stably. As illustrated in FIG. 1 and FIG. 2, the chain guide has a guide surface 110 at the top, and is fixedly attached inside the engine room using two mounting parts 123.

The guide surface 110 includes longitudinally extending first guide surfaces 111 and a second guide surface 112 parallel to and protruding more than the first guide surfaces.

The first guide surface 111 is formed on both sides in the width direction of the second guide surface 112, with guide lips 120 being provided on the outer sides in the width direction of both first guide surfaces 111 for restricting lateral movement of the timing chain.

Figure 3:
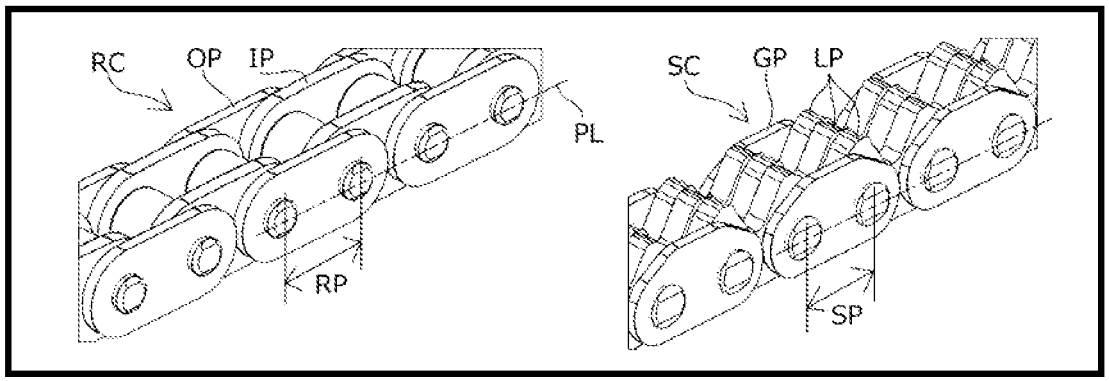
FIG. 3 is an illustrative view of chains to be used.

This embodiment is configured to be applicable for both a roller chain RC and a silent chain SC such as those shown in FIG. 3. The first guide surfaces 111 slidably guide inner link plates IP of the roller chain RC, while the second guide surface 112 slidably guides the back surfaces of link plates LP of the silent chain SC as shown in the schematic illustration of FIG. 4.

Figure 4:
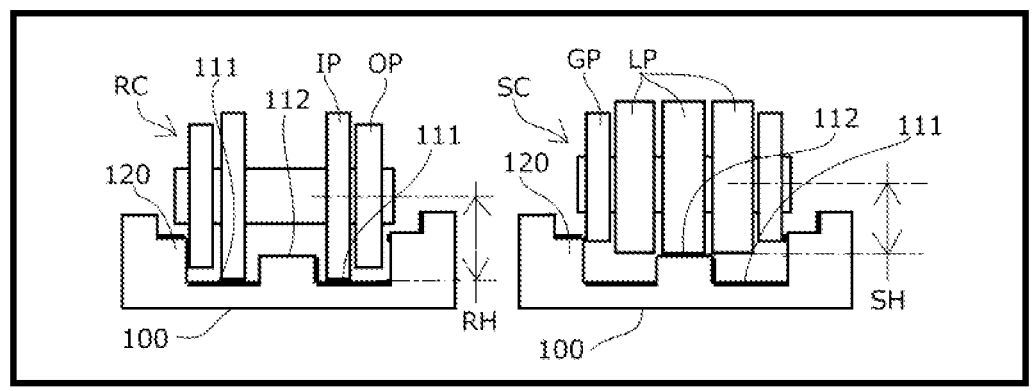
FIG. 4 is an illustrative view of chains and guide surfaces contacting each other.

As illustrated in FIG. 4, the guide lips 120 restrict the outer sides of the outer link plates OP of the roller chain RC. The guide lips 120 are configured to be higher than the protruding height of the second guide surface 112 in parts adjoining the first guide surfaces 111 so that they restrict the outer sides of guide plates GP of the silent chain SC.

Even when the chain layouts are the same and the chain guide has the same mounting parts, the chain pitch RP or SP would differ depending on which of the silent chain SC and the roller chain RC is to be used.

The backside height RH of the inner link plate IP of the roller chain RC (distance from the pitch line PL to the sliding surface) would also be different from the backside height SH of the link plate LP of the silent chain SC, as illustrated in FIG. 4.

This causes a difference in the optimal position and track of contact between the chain guide and the chain in the height direction, resulting in a difference in the optimal length of free span from the sprockets to the chain guide.

According to the present invention, the second guide surface 112 protrudes from the first guide surfaces 111 with varying heights along the longitudinal direction, i.e., does not protrude with a uniform height, which enables optimal setting of the position and track of contact between the chain guide and the chain in the height direction.

The first guide surfaces 111 are formed with first front-end inclined surfaces 113 and first rear-end inclined surfaces 115 that are smoothly continuous with the first guide surfaces 111 at one end and the other end in the longitudinal direction, respectively. The second guide surface 112 is formed with a second front-end inclined surface 114 and a second rear-end inclined surface 116 that are smoothly continuous with the second guide surface 112 at one end and the other end in the longitudinal direction, respectively.

The first front-end inclined surfaces 113, first rear-end inclined surfaces 115, second front-end inclined surface 114 and second rear-end inclined surface 116 are normally out of sliding contact with the chain but provided for lessening the impact when the chain vibrates up and down and contacts the first guide surfaces 111 and second guide surface 112. These parts, by having different lengths, allow for optimal setting of the position of contact between the chain guide and the chain in the longitudinal direction, and allow different chains to have an optimal free span length.

The first guide surfaces 111 and second guide surface 112 preferably have an arc-shaped track in the longitudinal direction with different centers.

Figure 5:
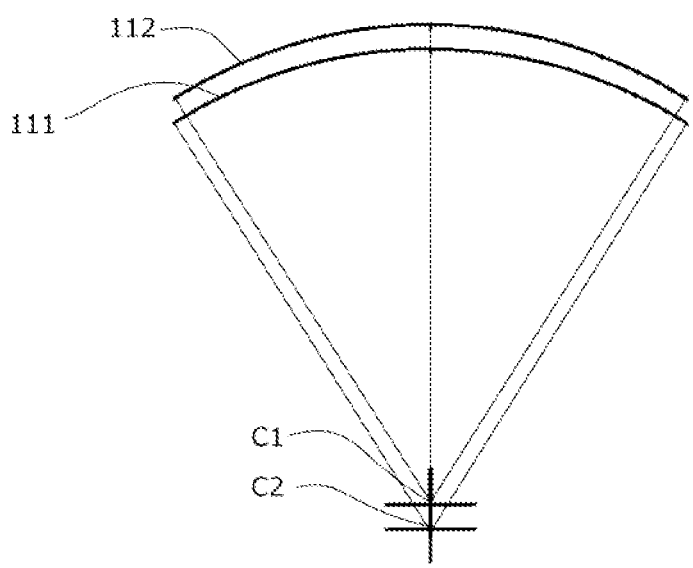
FIG. 5 is a schematic view of a first guide surface and a second guide surface in one embodiment.
Figure 6:
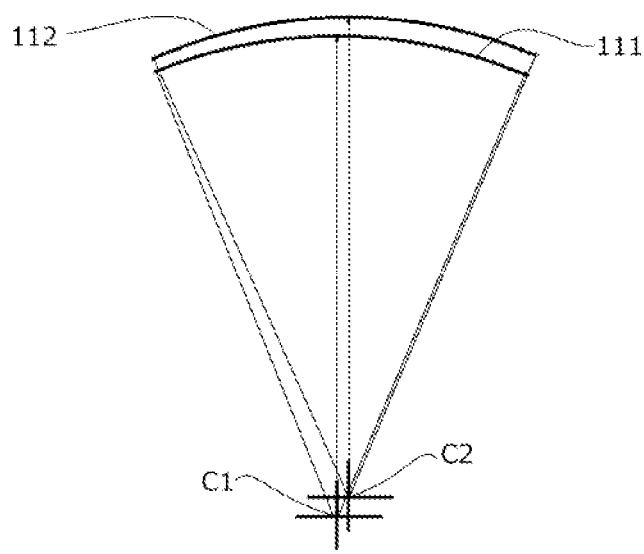
FIG. 6 is a schematic view of the first guide surface and second guide surface in another embodiment.
Figure 7:
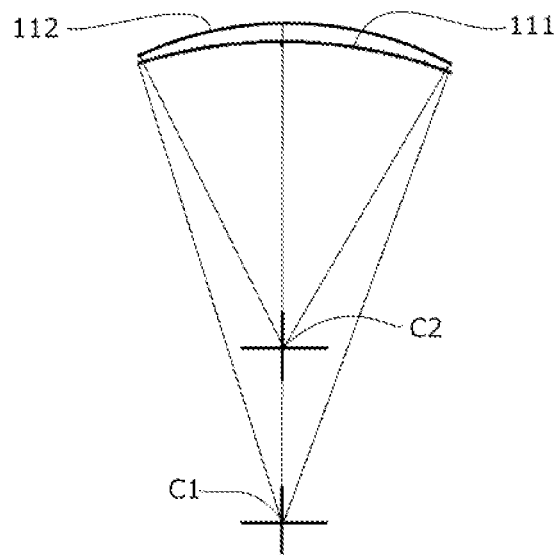
FIG. 7 is a schematic view of the first guide surface and second guide surface in yet another embodiment.
Figure 8:
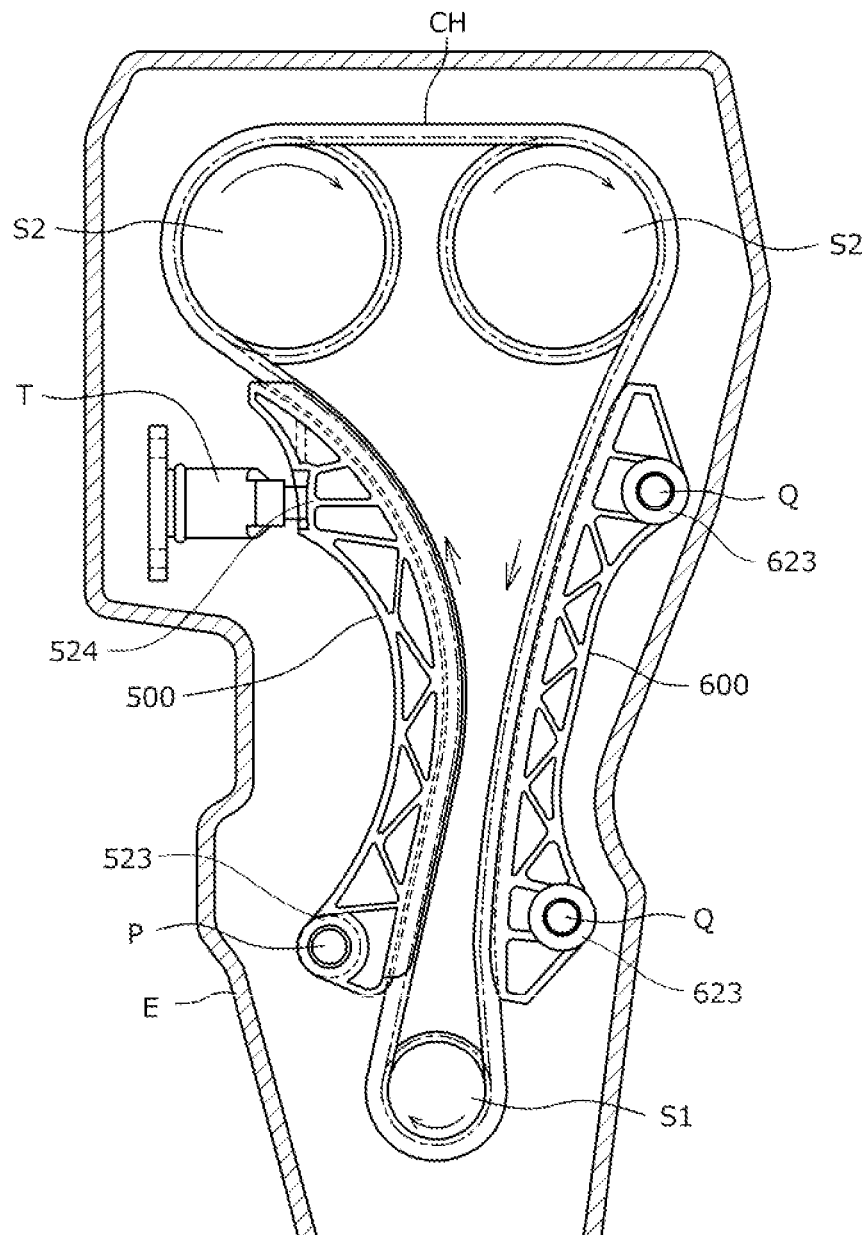
FIG. 8 is an illustrative view of an existing timing system of an engine.

For example, as illustrated in FIG. 5, the first guide surfaces 111 and second guide surface 112 may have tracks of the same radius of arc, with the center C2 being shifted from the center C1 closer to the chain. As illustrated in FIG. 6, the first guide surfaces 111 and second guide surface 112 may have tracks of the same radius of arc, with the center C2 being shifted from the center C1 closer to the chain and along the longitudinal direction. As illustrated in FIG. 7, the first guide surfaces 111 and second guide surface 112 may have tracks of different radii of arc, with the center C2 being shifted from the center C1 closer to the chain.

Note, the drawings of FIG. 5 to FIG. 7 are exaggerated for the purpose of illustration. The displacement in the track between the first guide surfaces 111 and the second guide surface 112 is actually very small, designed within such a range that the rollers of the roller chain RC do not contact the second guide surface 112.

While the embodiment has been described above with respect to specific examples of a chain guide according to the present invention, the chain guide of the present invention is not limited to these. Various modifications are possible in terms of shape, position, dimension, and the positional relationship of various components.

For example, while the embodiment described above showed one mode of use where it is used as a fixed guide, the chain guide may be used as a pivoting guide, in which case one of the two support parts could serve as a pressed part pressed by a tensioner.

The chain guide according to the embodiment has the support part at two points, but may be provided with three or more support parts.

While the embodiment described above is provided with only one second guide surface 112 in the center, the second guide surface 112 may be provided additionally on both outer sides of the first guide surfaces 111 for use with a silent chain SC having a larger width than that of the roller chain PC.

To accommodate chains having different sliding contact positions in the width direction, any numbers of first guide surface 111 and second guide surface 112 may be provided anywhere in the width direction, and the plurality of guide surfaces may have different tracks.

The shape of the guide lips 120 and the positions where they restrict the chain can be designed flexibly as required for the chain to be used.

While the embodiment described above is provided inside an engine that has a timing system, the chain guide is applicable not only to this but to various equipment.

The chain guide is applicable in various industrial fields for similar drive mechanisms that use not only chains, but also belts, ropes and the like.

What is claimed is:

1. A chain guide comprising a guide surface slidably guiding a running chain, and at least one mounting part,
   the guide surface including a first guide surface extending along a longitudinal direction, a second guide surface parallel to and protruding more than the first guide surface, a second front-end inclined surface and a second rear-end inclined surface that are smoothly continuous with the second guide surface at one end and the other end in the longitudinal direction, the second guide surface protruding from the first guide surface with varying heights along the longitudinal direction.

2. The chain guide according to claim 1, wherein the first guide surface and the second guide surface have an arc-shaped track in the longitudinal direction with different centers.

3. The chain guide according to claim 1, wherein the first guide surface is formed on both sides in a width direction of the second guide surface.

4. The chain guide according to claim 3, further comprising a guide lip provided on both sides in the width direction of the guide surface, the guide lip being formed to protrude higher than the second guide surface in a portion adjoining the guide surface.

5. The chain guide according to claim 1, wherein at least one end in the longitudinal direction of the first guide surface is formed with an inclined surface smoothly continuous with the first guide surface.

* * * * *